(12) United States Patent
Siman-Tov

(10) Patent No.: US 7,772,725 B2
(45) Date of Patent: Aug. 10, 2010

(54) APPARATUS AND METHOD FOR CURRENT CONTROL IN H-BRIDGE LOAD DRIVERS

(75) Inventor: Alon Siman-Tov, Or-Yehuda (IL)

(73) Assignee: Eastman Kodak Company, Rochester, NY (US)

( * ) Notice: Subject to any disclaimer, the term of this patent is extended or adjusted under 35 U.S.C. 154(b) by 876 days.

(21) Appl. No.: 11/533,523

(22) Filed: Sep. 20, 2006

(65) Prior Publication Data

US 2007/0064460 A1    Mar. 22, 2007

Related U.S. Application Data

(60) Provisional application No. 60/719,447, filed on Sep. 22, 2005.

(51) Int. Cl.
*H01H 9/54* (2006.01)
(52) U.S. Cl. .................................... 307/140
(58) Field of Classification Search ............... 307/140
See application file for complete search history.

(56) References Cited

U.S. PATENT DOCUMENTS

| | | | |
|---|---|---|---|
| 5,309,347 A | 5/1994 | Poma et al. | |
| 5,428,522 A * | 6/1995 | Millner et al. | 363/63 |
| 5,642,247 A | 6/1997 | Giordano | |
| 5,963,706 A | 10/1999 | Baik | |
| 5,990,640 A | 11/1999 | Dwyer et al. | |
| 6,131,692 A | 10/2000 | Kawasuji | |
| 6,147,545 A | 11/2000 | Marshall | |
| 6,683,437 B2 | 1/2004 | Tierling | |
| 6,943,514 B1 | 9/2005 | Chen et al. | |
| 7,096,073 B2 | 8/2006 | Burkatovsky | |
| 2005/0127859 A1 | 6/2005 | Kernhof et al. | |

FOREIGN PATENT DOCUMENTS

WO    WO 2006/008732 A2    1/2006

OTHER PUBLICATIONS

John Constantopoulos, Texas Instruments GmbH, "Pre-empting Problems in the Automotive Environment", Sep. 2006, pp. 42-44, www.powersystemsdesign.com.

* cited by examiner

*Primary Examiner*—Robert L. DeBeradinis
(74) *Attorney, Agent, or Firm*—Roland R. Schindler, II

(57) ABSTRACT

An electronic current control circuit is provided. This electronic circuit comprises a power-supply, an H-Bridge module connected to a load, and a current sensor connected between the H-Bridge module and the power-supply and adapted to sense load current characteristics. A computerized controller is connected to the current sensor and the H-Bridge module, includes at least a module for operating load current analysis algorithm for analyzing the load current characteristics to determine current control parameters that provide over-current protection and load current control. A load current control module controls the H-Bridge module based upon the current control parameters.

9 Claims, 11 Drawing Sheets

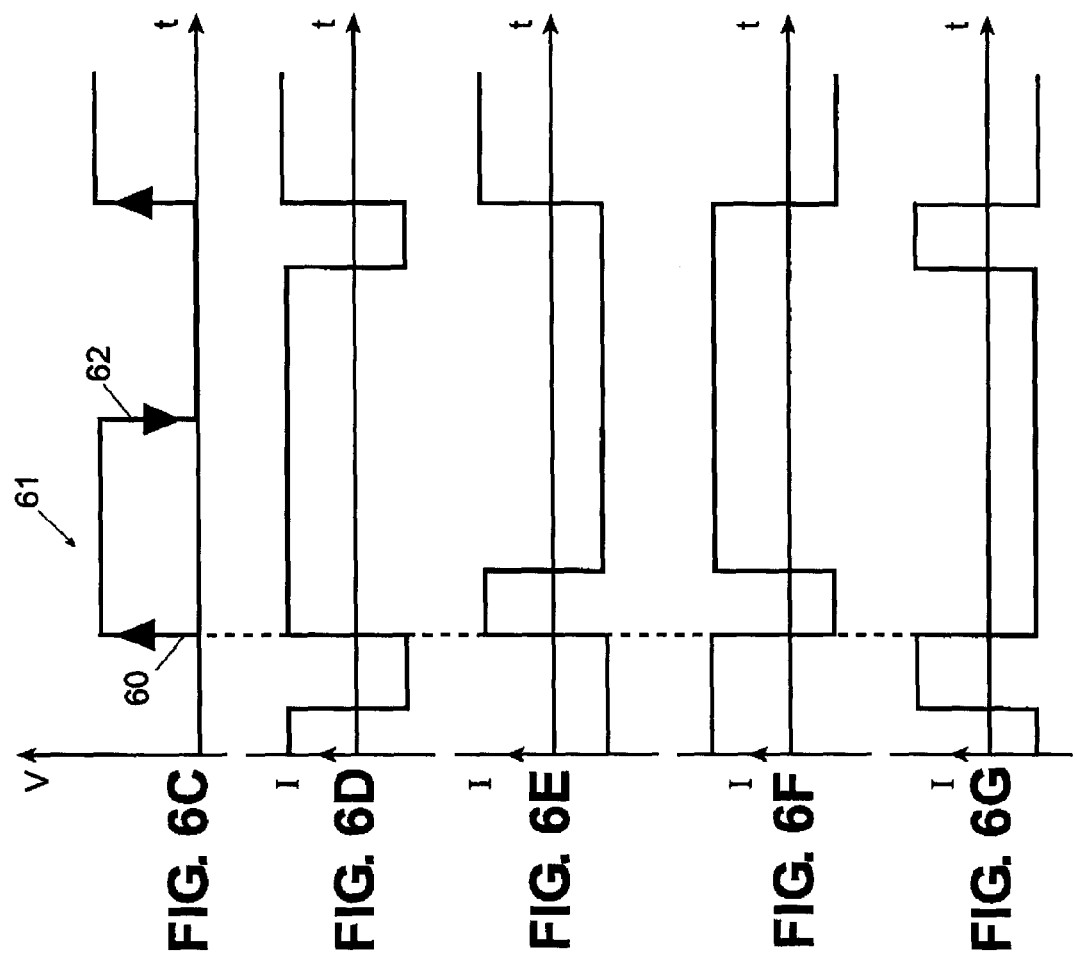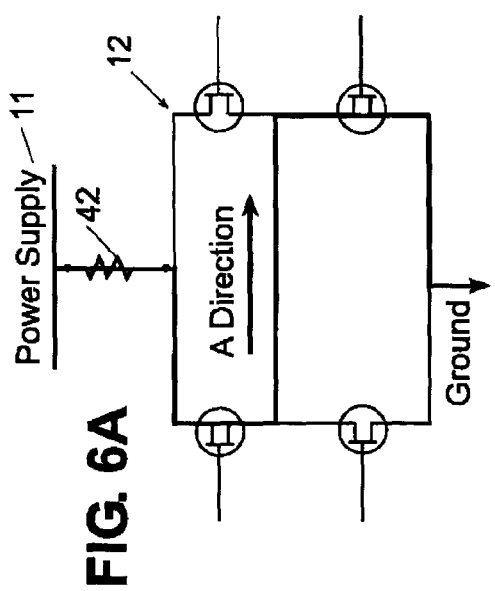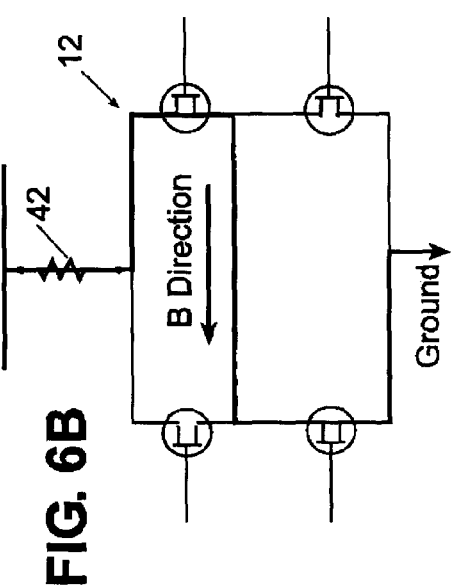

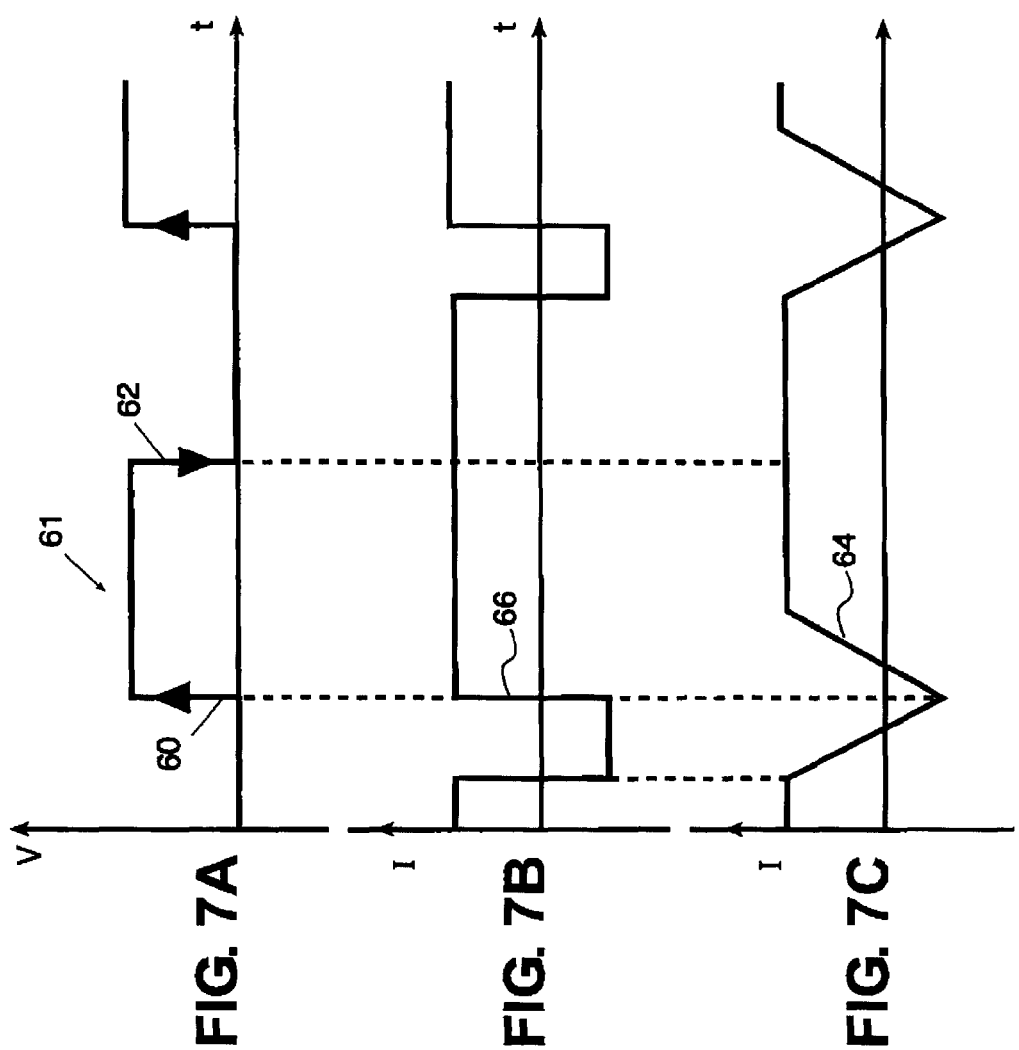

APPARATUS AND METHOD FOR CURRENT CONTROL IN H-BRIDGE LOAD DRIVERS

CROSS-REFERENCE TO RELATED APPLICATIONS

This application claims priority from U.S. Provisional Application No. 60/719,447 entitled "The Use of Configurable Electronic Controller Technology in Vehicles" filed by Burkatovsky on 22 Sep. 2005. Further reference is made to commonly assigned, co-pending patent application U.S. Ser. No. 11/533,538, entitled "Configurable Electronic Control System and Diagnostic Method", filed concurrently herewith in the name of Siman-Tov.

FIELD OF THE INVENTION

The present invention relates to an improved load driver circuitry, particularly of the H-Bridge type, useful in industrial computerized automation and configurable electronic controllers.

BACKGROUND OF THE INVENTION

Electronic controllers are widely used in industrial automation and automotive applications, usually custom designed for specific groups of input sensors output devices and control applications. Configurable Electronic Controllers (CEC), as described, for example, in U.S. Pat. No. 7,096,073, entitled "Configurable Controller" filed by Burkatovsky on Sep. 22, 2005, are considered particularly versatile, enabling design of electronic controllers capable of measuring a variety of digital and analog sensors, as well as controlling a range of output devices such as motors, solenoids and lamps. The CEC flexibility on both input and output sides of the controller is achieved essentially by use of a configurable in/out interface.

H-Bridge is a well-known current load driver scheme, available in many practical configurations, such as for example types HIP4080AIB of Intersil and type LMD18200 of National Semiconductors.

The use of prior art H-Bridge module in a load driver and control circuitry is schematically shown in FIG. 1. As shown in FIG. 1, load 20 is of a type that requires bidirectional current control. Examples of which include, but are not limited to, a DC motor, stepper motors, or a thermoelectric cooler device. One circuit that is commonly used in the art to provide such bi-directional control is an H-Bridge module 12. For reliable H-Bridge current control it is advisable to have some kind of fast current protection mechanism. In the prior art system of FIG. 1, a protection current sensor 16 is used on a high side of H-Bridge module 12, in order to protect against any over current situation, such as may be caused by a short circuit, including a short between the wires 18 connecting load 20 to H-Bridge module 12, and Ground. When such over current is detected, controller 10 is turned off immediately by the electronic switch acting as an electronic fuse 22. In addition, a load control current sensor (value and direction) 14 is usually connected in a low side of H-Bridge module 12.

Controller 10 controls the current of load 20 by using, for example, known-in-the art pulse width modulation (PWM) based on locked anti-phase method, or using known-in-the-art pulse width modulation (PWM) based on sign & magnitude method.

FIG. 2 schematically illustrates, another well-known embodiment, a load driver and control circuitry for an H-Bridge module including: a configurable digital unit, such as a field programmable gate array (FPGA) based controller 10, a load control current sensor module 14 on the low-side of H-Bridge module 12 for load current control, a protection current sensor module 16 on the high-side of H-Bridge module 12, and an electronic fuse 22 as a current protection mechanism. As shown in FIG. 2, H-Bridge module 12 drives load 20 as a load.

Other known-in-the-art applications use a complex high-side current sensor for both current control and protection, based on a double sense method, which limits the pulse width modulation (PWM) functionality and the protection level as explained in the data sheet for the LMD18200 driver mentioned above.

The following patents and application publication describe various aspects of the use of H-Bridges in load control circuitry: U.S. Pat. No. 6,683,437 to Tierling, issued Jan. 27, 2004, entitled "Current Controlled Motor Amplifier System"; U.S. Pat. No. 6,147,545 to Marshall, issued Nov. 14, 2000, entitled "Bridge Control Circuit for Eliminating Shoot-Through Current"; U.S. Pat. No. 5,990,640 to Dwyer et al., issued Nov. 23, 1999, entitled "Motor Control Apparatus"; U.S. Pat. No. 5,642,247 to Giordano, issued Jun. 24, 1997, entitled "Automatic Fault Monitoring System and Motor Control System Incorporating Same"; U.S. Pat. No. 5,963,706 to Baik, issued Oct. 5, 1999 entitled "Control System for Multi-Phase Brushless DC Motor"; U.S. Pat. No. 5,309,347 to Poma et al., issued May 3, 1994, entitled "H-Bridge Circuit with Protection Against Crossover Conduction"; U.S. Pat. No. 6,943,514 to Chen et al., issued Sep. 13, 2005, entitled "Motor Control Circuit for Supplying a Controllable Driving Current"; U.S. Pat. No. 6,131,692 to Kawasuji, issued Oct. 17, 2000, entitled "Electric Power Steering Controller"; and U.S. Application Publication No. 2005/0127859 to Kernhof et al., filed Dec. 13, 2004, entitled "32V H-Bridge Driver with CMOS Circuits".

Modern configurable electronic controllers, such as the one described in U.S. Pat. No. 7,096,073, include a multiplicity of input-cells for measuring various types of input sensors and a multiplicity of output-cells for driving and controlling various types of output devices. Such output-cells can be configured to form an H-Bridge module and control circuitry of the types discussed above. The multiplicity of output cells dictates a practical need to minimize the controller's complexity and size, especially in larger industrial systems, an issue having direct bearing on space, cost and reliability of the control device, especially in mass production. There is, therefore, a need to design better modular and more compact circuitry for current protection mechanism and load current sensing (value and direction), serving H-Bridge load control designs.

SUMMARY OF THE INVENTION

An object of the present invention is to provide an electronic apparatus and method of controlling current in H-Bridge load drivers.

An electronic circuit of current control is provided. In one embodiment, this electronic circuit comprises a power-supply, an H-Bridge module connected to a load, and a current sensor connected between the H-Bridge module and the power-supply and adapted to sense load current characteristics. A computerized controller, connected to the current sensor and the H-Bridge module, includes at least a module for operating load current analysis algorithm for analyzing the load current characteristics to determine current control parameters that provide over-current protection and load current control. A load current control module for controlling the H-Bridge module based upon the current control parameters.

BRIEF DESCRIPTION OF THE DRAWINGS

The invention is herein described, by way of example only, with preference to the accompanying drawings, wherein:

FIG. 6A and FIG. 6B are schematic simplified drawings of FIG. 5A and FIG. 5B respectively;

FIG. 6C to FIG. 6G represent timing diagrams of the waveforms involved in a first preferred embodiment of the H-Bridge control method;

FIG. 7A to FIG. 7C represent timing diagrams of the waveforms involved in the first preferred embodiment of the H-Bridge control method, including rise and fall time effects;

DESCRIPTION OF PREFERRED EMBODIMENTS

The described invention hereinafter relates to a novel method of current sensing and control as related to H-Bridge load drivers, useful in computerized electronic controller based systems.

Figure 1:
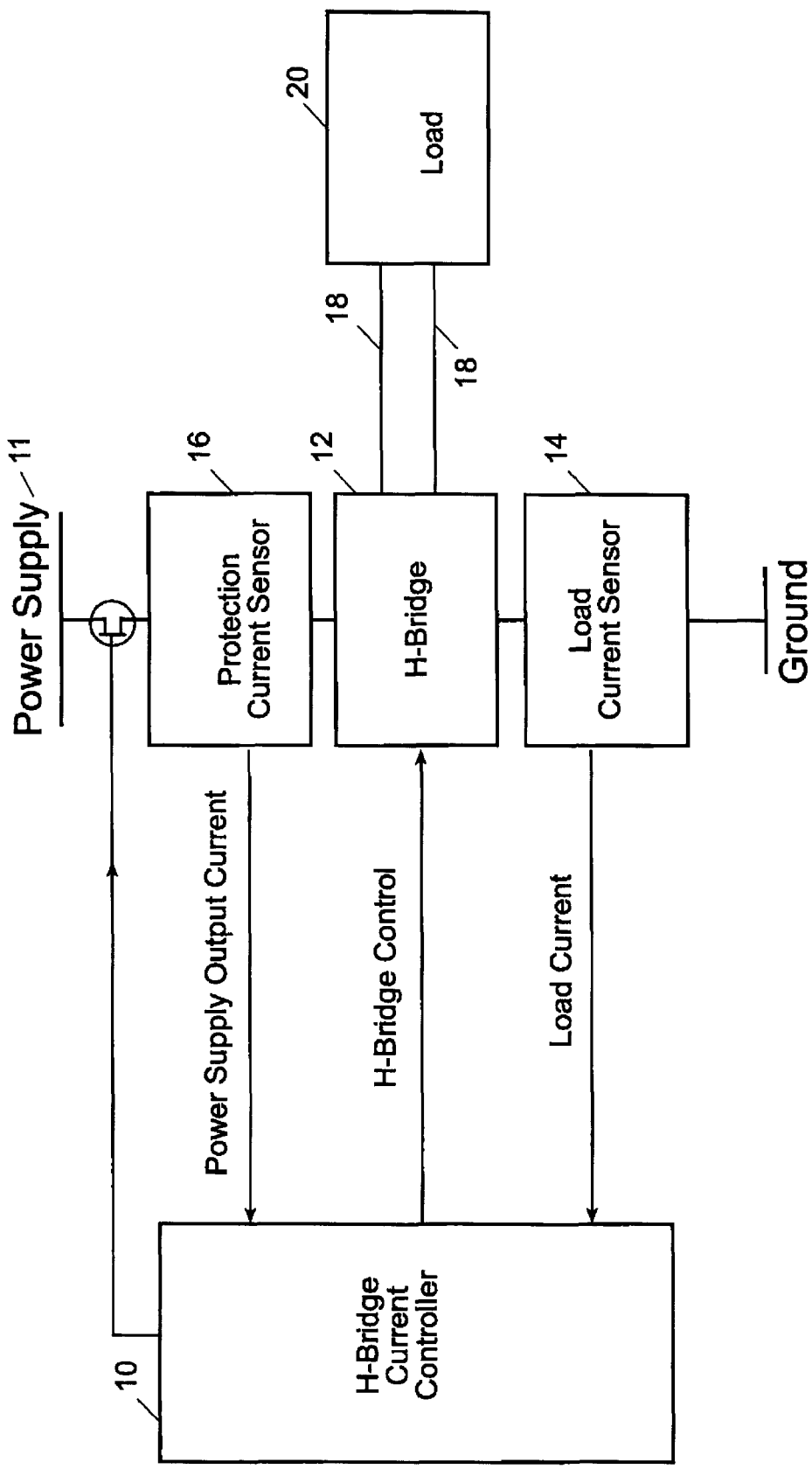
FIG. 1 is a schematic block-diagram of prior-art control circuitry associated with an H-Bridge driving a load.
Figure 2:
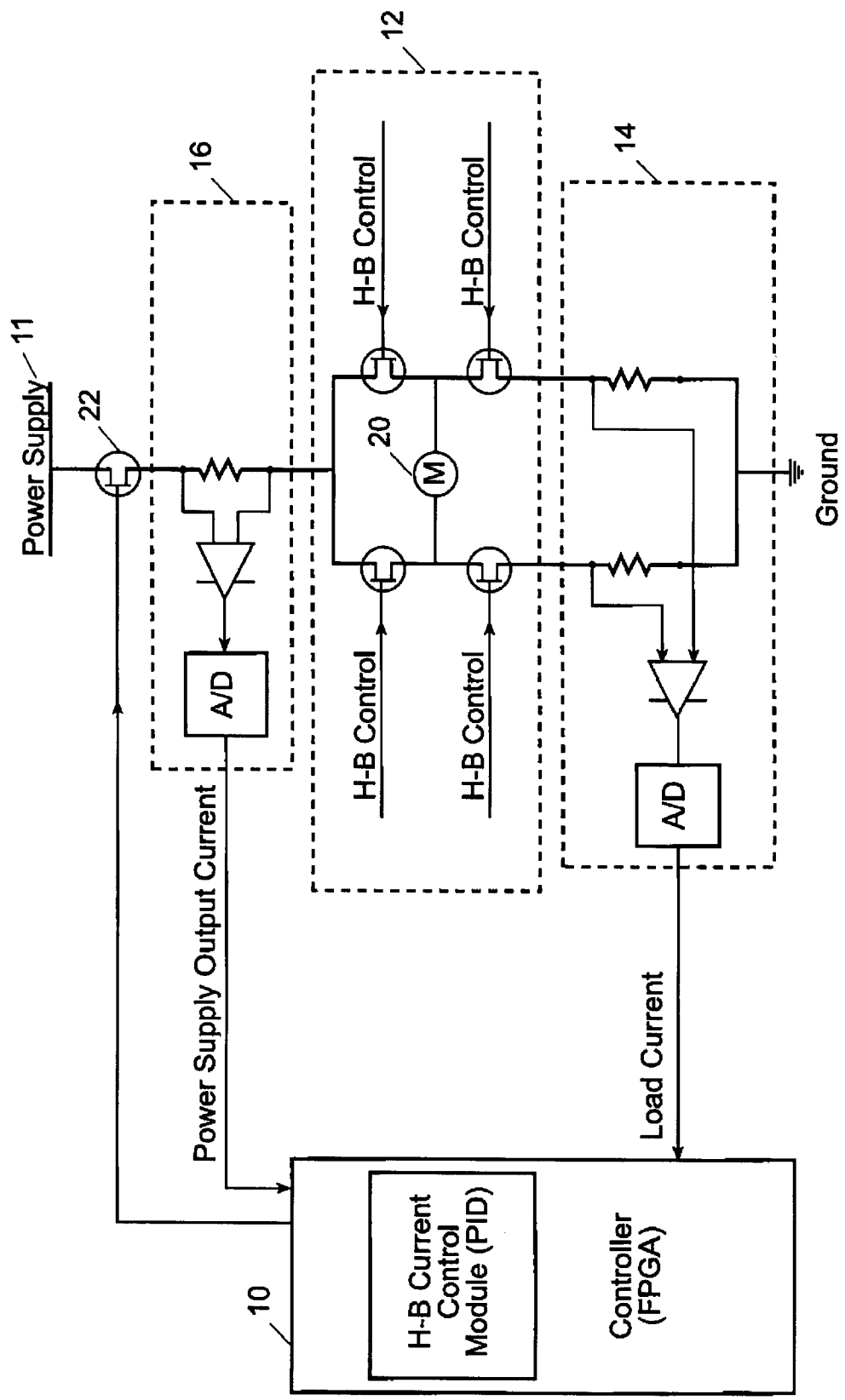
FIG. 2 is a schematic diagram of prior-art computerized control circuitry associated with an H-Bridge driving a load.
Figure 3:
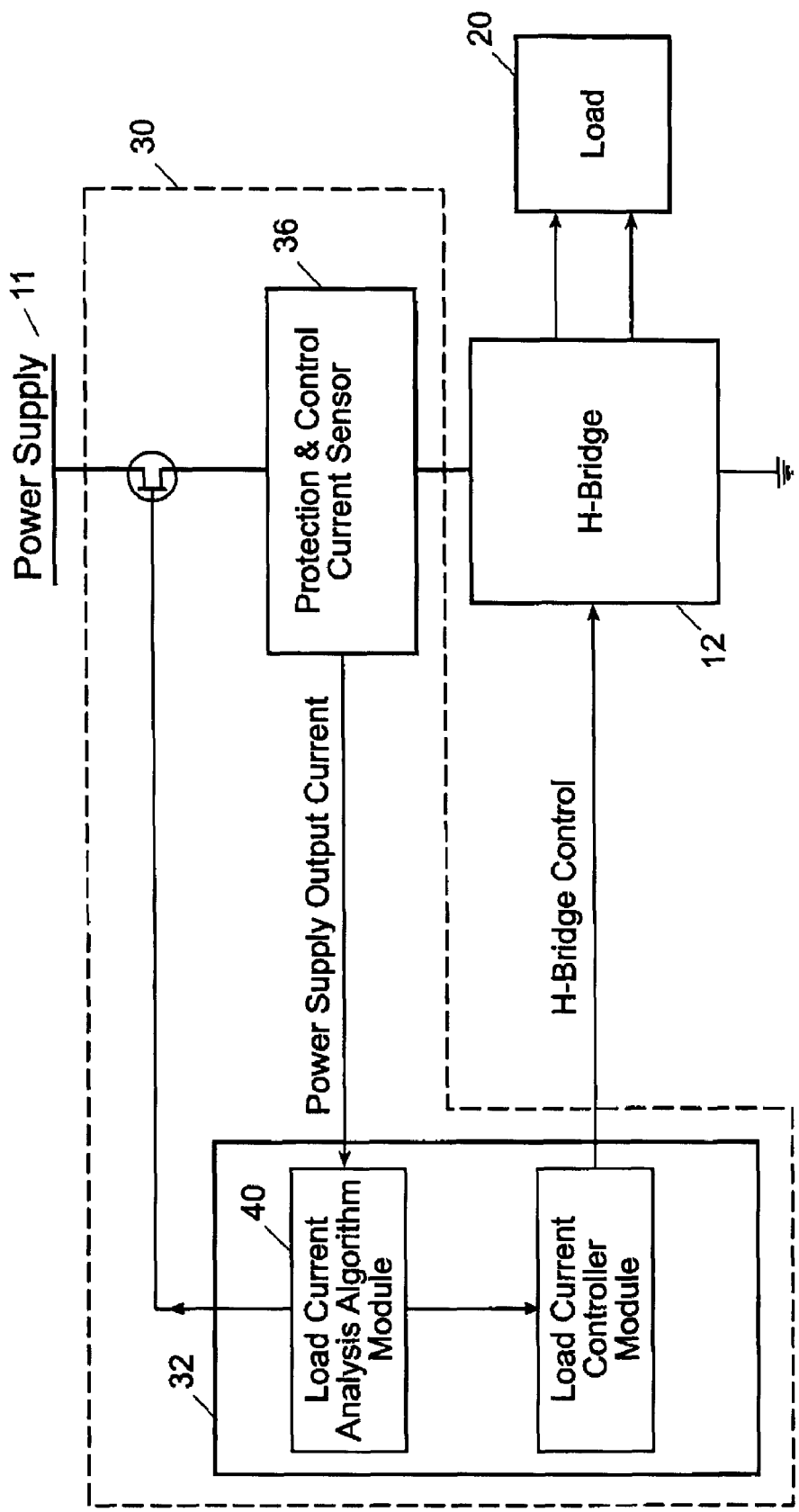
FIG. 3 is a schematic block-diagram of an H-Bridge single current sensor control, as described in the present invention.

FIG. 3 schematically illustrates one embodiment of a current control circuit 30. In this embodiment, current control circuit 30 comprises a single current sensor module 36, connected in the high-side of H-Bridge module 12 between a power supply 11 and H-Bridge module 12. As shown in FIG. 3, H-Bridge module 12 is connected to and drives a load 20. Current sensor module 36 senses current flow characteristics during the operation of H-Bridge module 12 of load 20. A signal representing the measured current is supplied to a computerized controller 32. Controller 32 receives the signal representing the measured current and a load current analysis algorithm module 40 that analyzes the sensed current characteristics to determine, by use of suitable algorithms, current control parameters that provide over-current protection and load current control. A load current control module 44 provides control signals for the H-Bridge module based upon the current control parameters.

Figure 4:
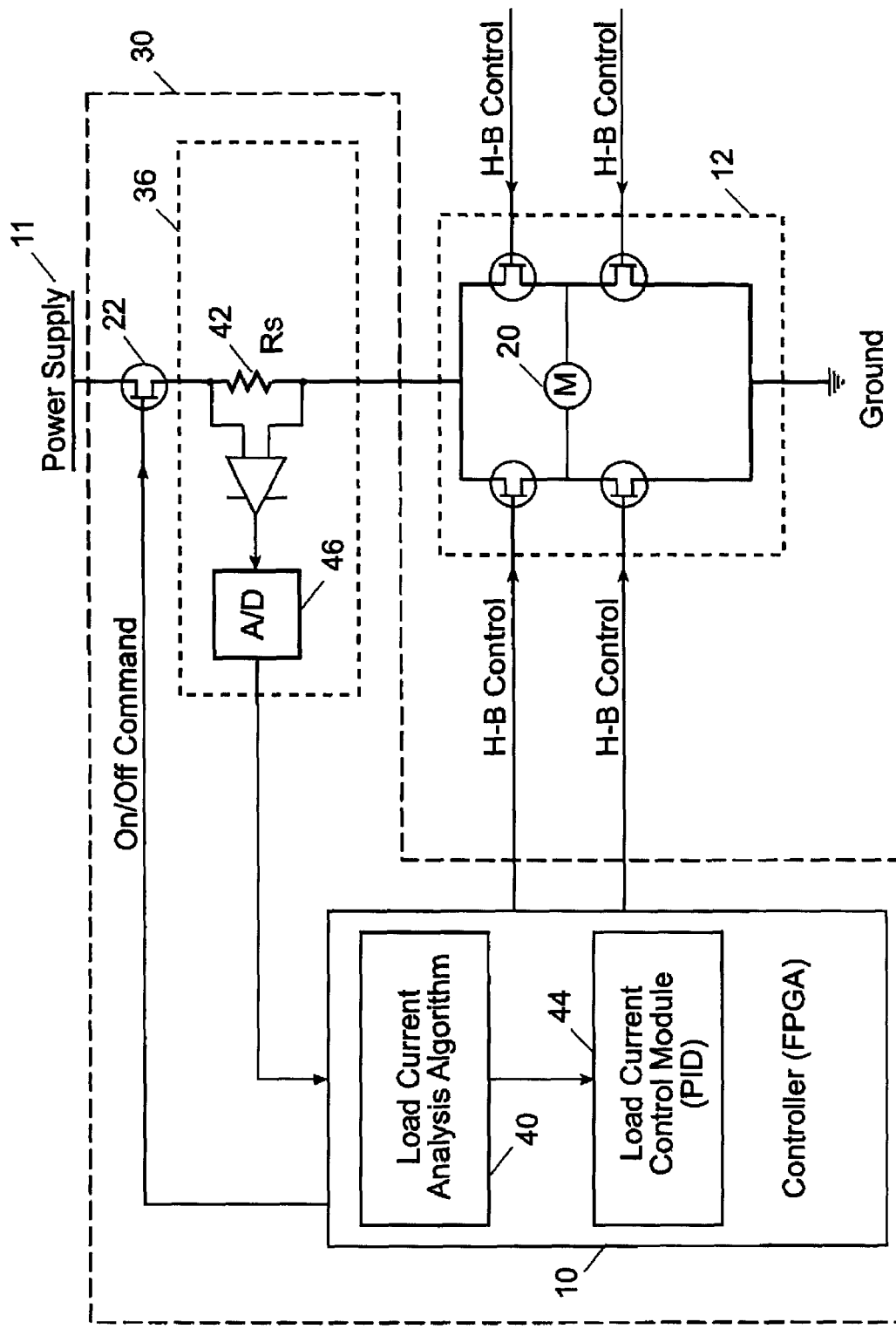
FIG. 4 is a schematic drawing of an H-Bridge single current sensor control circuitry, as described in the present invention.

FIG. 4 further details, by way of an example, the schematic description of FIG. 3. As is shown in FIG. 4, the current supplied to H-Bridge module 12 driving load 20 is measured by a current sensor module 36 comprising a single resistor Rs 42 and an analog to digital (A/D) unit 46. In the embodiment illustrated, resistor Rs 42 has a practical value of less than 1 Ohm, however, other resistance values can be used. Alternatively to resistor Rs 42, other current sensors can be used for the same purpose such as type A1321 Hall effect magnetic field sensor manufactured by Allegro or type AB001 GMR magnetic field sensor sold by NVE Corporation.

The digital output of current sensor module 36 is fed to controller 10, specifically to load current analysis algorithm module 40. Algorithm module 40 is designed and adjusted for any type of H-Bridge current control method or for special needs. Examples of algorithms used will be further discussed hereinafter. The results of the analysis by algorithm module 40 are fed into H-Bridge current control module 44, which is responsible for performing specific H-Bridge current control and regulation tasks required, as well as to an optional electronic fuse 22, which can provide safety for current control circuit 30. In practice, current sensor module 36 can be realized as a small chip or integrated into a larger semiconductor structure.

Figure 5A:
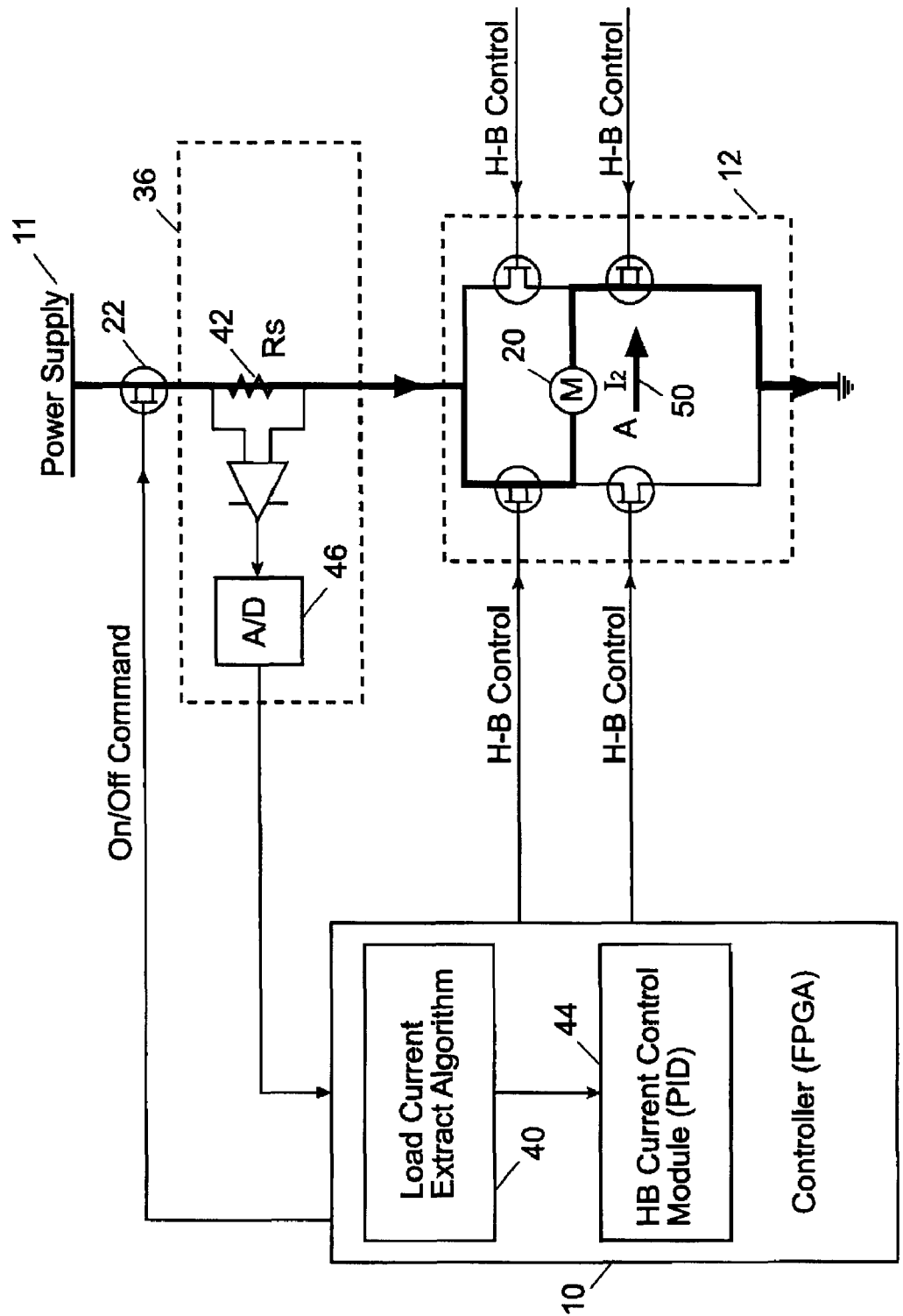
FIG. 5A and FIG. 5B are schematic drawings of an H-Bridge single current sensor control circuitry, demonstrating the A and B load current flow directions respectively.
Figure 5B:
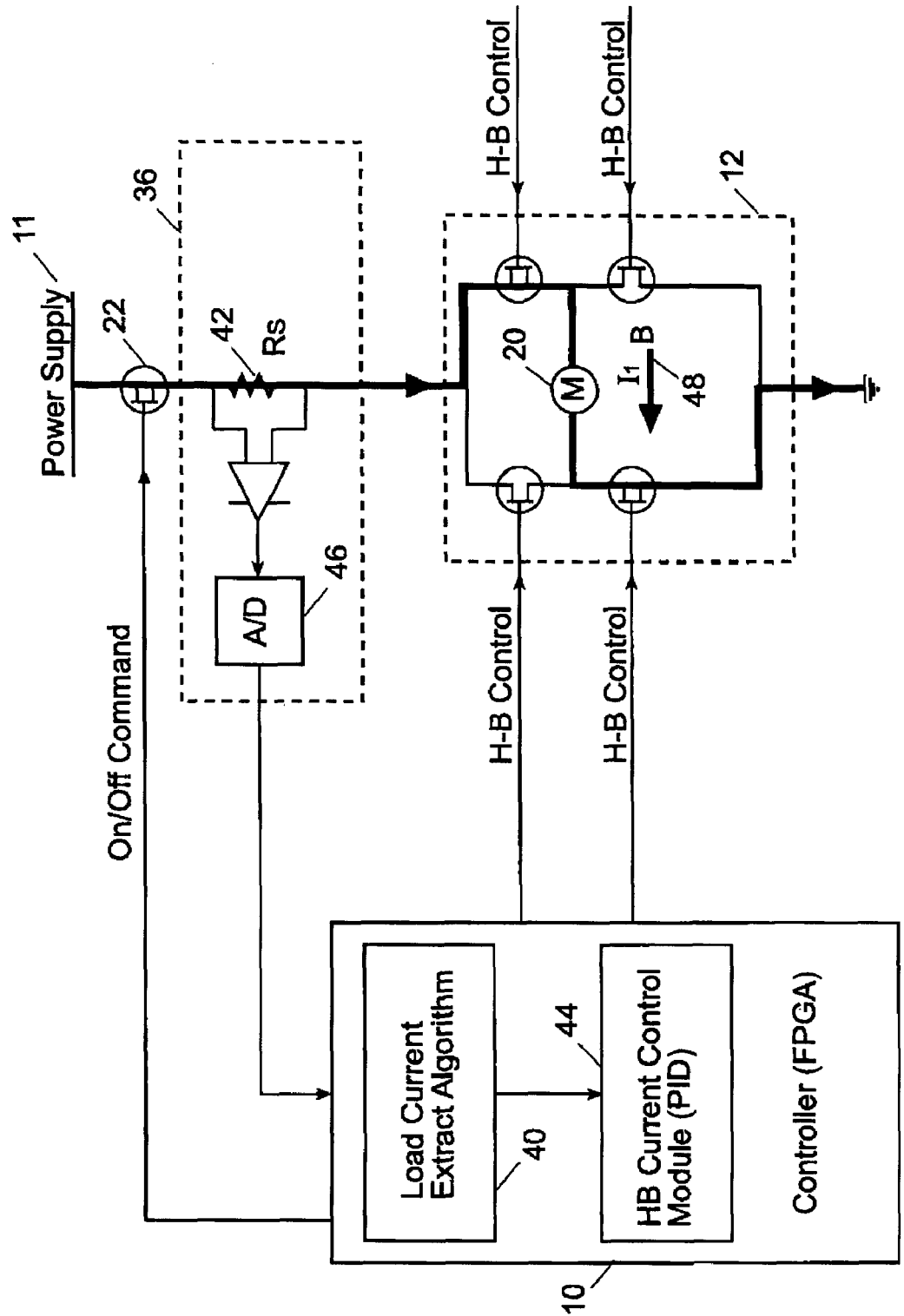

The complexity of the analysis of the current (value and direction) flowing in resistor Rs 42 is demonstrated, as an example, by FIGS. 5A and 5B, wherein the current $I_1$ 48 flowing through DC load 20 is in B direction in FIG. 5B, and the current $I_2$ 50 flowing through DC load 20 in FIG. 5A is in A direction (the opposite direction). Nevertheless, the respective currents measured on resistor Rs 42 in current sensor module 36 of both FIGS. 5A and 5B, are flowing in the same direction.

The analysis, performed by algorithm module 40, of the characteristics of the current measured on resistor Rs 42, and the control implications related to the subsequent control functions of H-Bridge module 12 are demonstrated, as an example, in the schemes FIG. 6A and FIG. 6B, diagrams FIG. 6C to 6G and the flow-diagram of FIG. 7. It will be appreciated that there are a number of well-known current control methods for controlling current flow in an H-Bridge that can be selected for a particular application. The analysis algorithm executed by algorithm module 40 will typically be determined at least in part based upon which of these current control methods are used. In the following, example, the analysis algorithm used by algorithm module 40 is useful for the Locked Anti-Phase H-Bridge control method known to those of skill in the art.

The Extract Algorithm for Locked Anti-Phase H-Bridge Control Method:

The algorithm is based on the analysis of four load 20 current states and waveforms, as compared with the H-Bridge pulse width modulation (PWM) clock waveform 61 shown in the diagram of FIG. 6C:

1. FIG. 6A and FIG. 6D: the load 20 current is in the A direction and is stable or increasing.
2. FIG. 6A and FIG. 6E: the load 20 current is in the A direction and is decreasing.
3. FIG. 6B and FIG. 6F: the load 20 current is in the B direction and is stable or increasing.
4. FIG. 6B and FIG. 6G: the load 20 current is in the B direction and is decreasing.

The algorithm is executed in algorithm module 40 of controller 10, in all four cases the current values for load 20, as measured on resistor Rs 42, are extracted from current sensor module 36 and the current waveforms of FIG. 6D to FIG. 6G are analyzed in comparison with the rising edge 60 of the H-Bridge pulse width modulation (PWM) clock waveform 61 of FIG. 6C.

The algorithm is designed to overcome current sense rise time and fall time effects as encountered on resistor Rs 42. These effects shown in FIG. 7C are compared with the theoretical situation shown in FIG. 7B and the H-Bridge pulse width modulation (PWM) clock waveform 61 shown in FIG. 7A.

The sensed current waveform 64 in FIG. 7C sampled at the rising edge 60 of H-Bridge PWM clock of FIG. 7A is distorted and ambiguous, as compared to the theoretical waveform 66 of FIG. 7B. The algorithm is designed to recognize such situation and synchronize the value extraction on the falling edge 62 of the H-Bridge PWM clock waveform 61, instead of on the rising edge 60.

Figure 8:
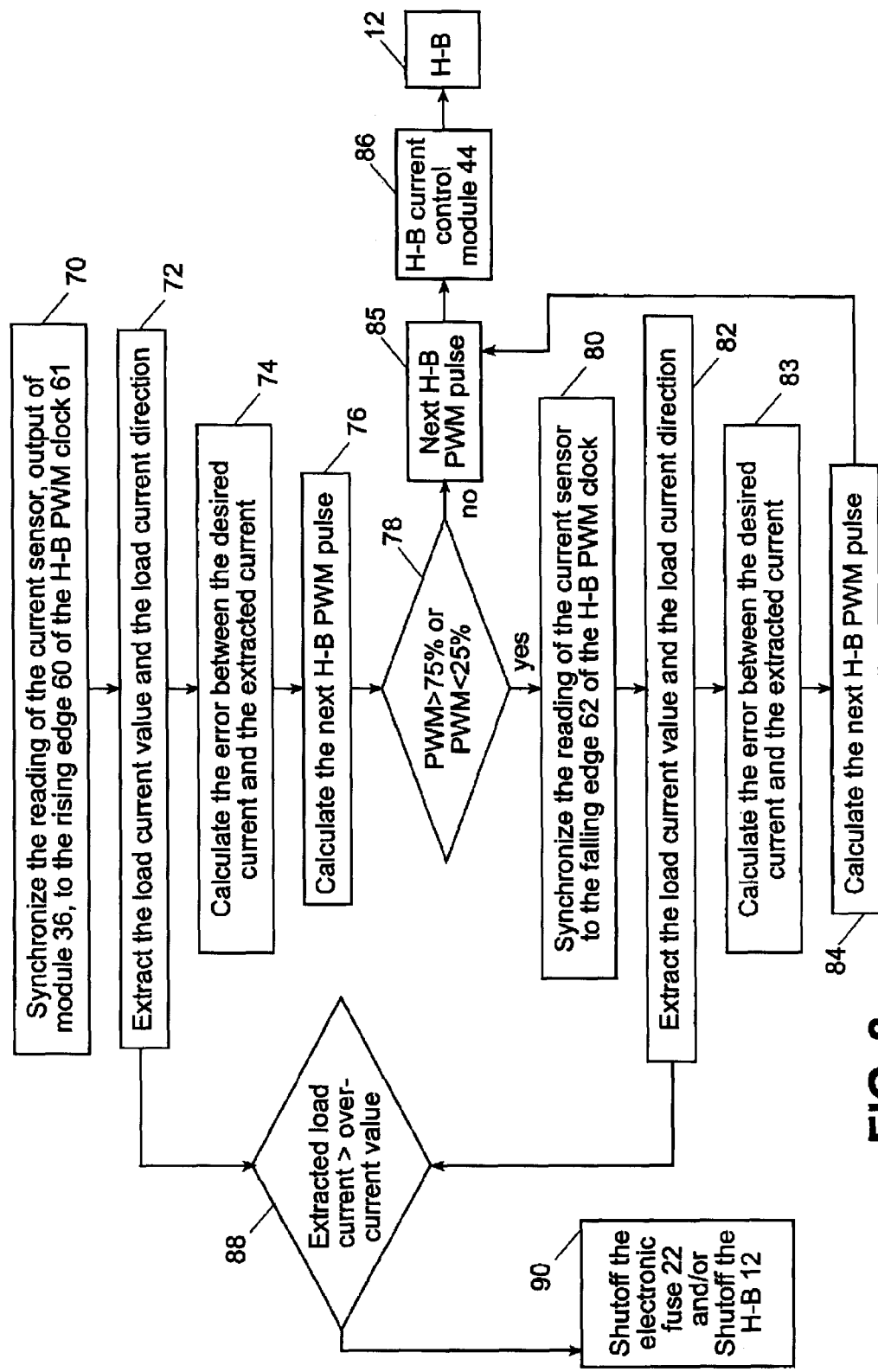
FIG. 8 is a schematic block-diagram of an operational workflow executing the algorithm of the first preferred embodiment of the H-Bridge control method, as described in this invention.

The execution of the algorithm is schematically described in the flow diagram of FIG. 8:

Task 70: The current sensor on resistor Rs 42, as measured at the output of current sensor module 36, is synchronized to the rising edge 60 of the H-Bridge PWM clock waveform 61.

Task 72: The load current value and direction is extracted as schematically explained in the schemes and diagrams of FIG. 6.

Task 74: The difference between the extracted current value and the desired control current is calculated.

Task 76: The next H-Bridge PWM pulse is calculated.

Task 78: The extracted current trustworthiness is checked in aspect of rise time and the fall time effects as explained re FIG. 7. As per the known in the art method, the next PWM pulse is examined vs. the H-Bridge PWM clock period: if the PWM pulse is too narrow (more than 75% or less than 25% of the H-Bridge PWM clock period) the load current should be extracted again, but in a different way.

Task 80: The current sense over resistor Rs 42, as measured at the output of current sensor module 36, is synchronized to the falling edge 62 of the H-Bridge PWM clock waveform, as explained above re FIG. 7.

Task 82: The load current value and direction is extracted as schematically explained in the diagrams of FIG. 6.

Task 83: The difference between the extracted current value and the desired control current is calculated.

Task 84: The next H-Bridge PWM pulse is calculated.

Task 85: In this task the calculated "next H-Bridge PWM pulse" is stored, and

Task 86: The "next H-Bridge PWM pulse" is delivered to H-Bridge current control module 44 and subsequently to the H-Bridge module 12.

Task 88: Monitoring over-current: the extracted load current of Tasks 72 or 82 is compared with the over-current value.

Task 90: When over-current is detected, the electronic fuse 22 and/or the H-Bridge module 12 are shut-off.

Figure 9:
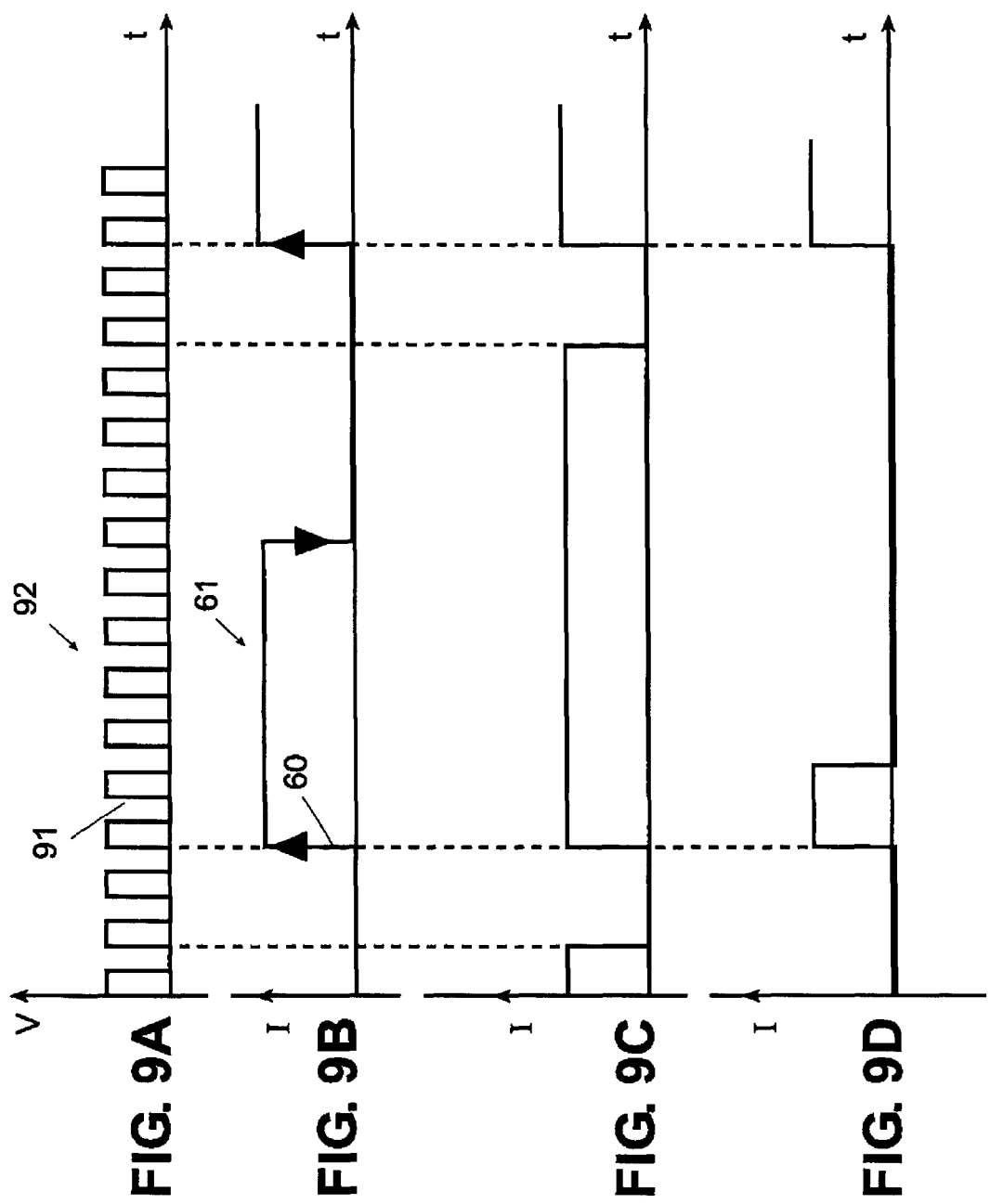
FIG. 9A to FIG. 9D represent timing diagrams of the waveforms involved in a second preferred embodiment of the H-Bridge control method.
Figure 10:
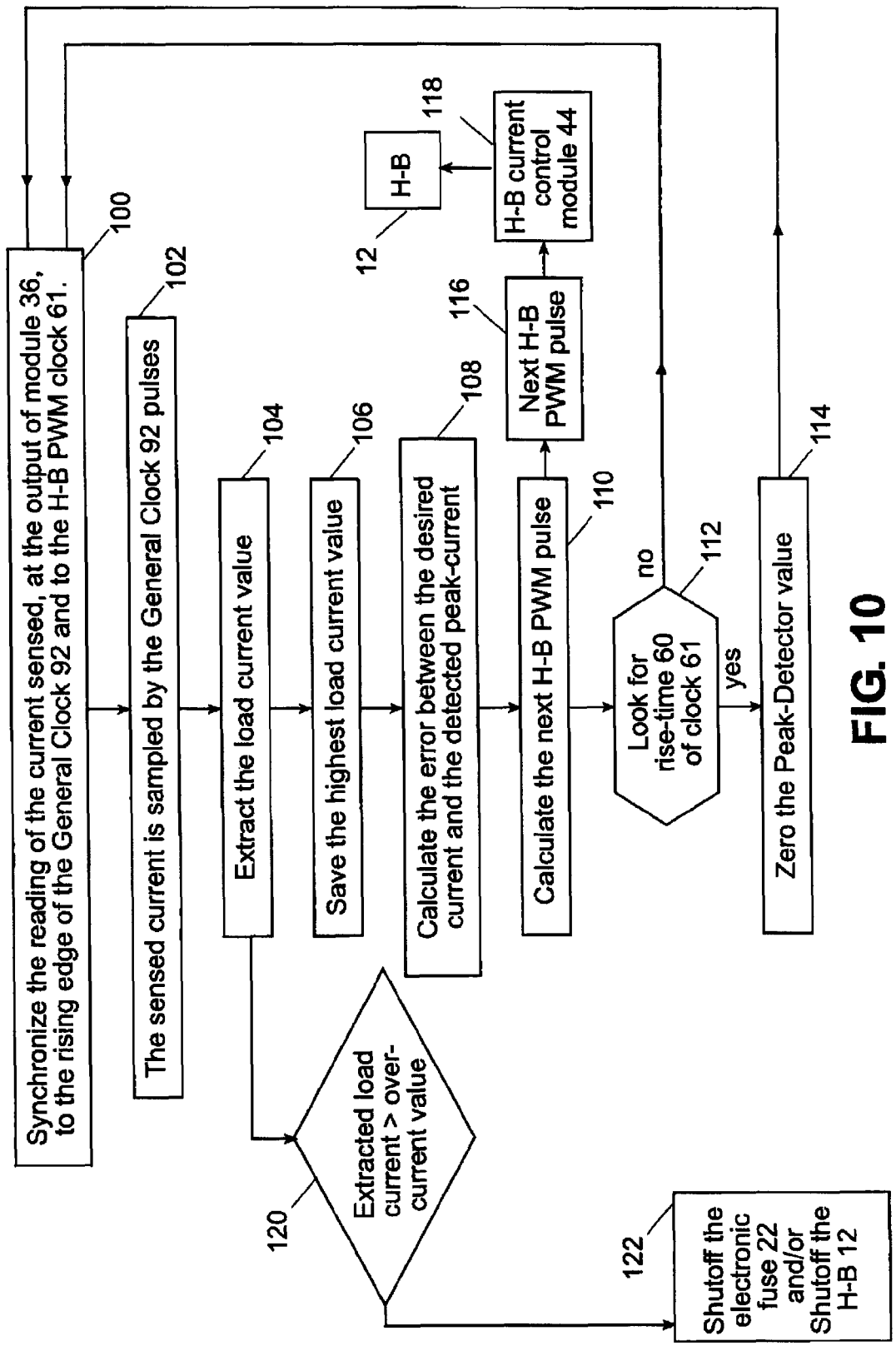
FIG. 10 is a schematic block-diagram of an operational workflow executing the algorithm of the second preferred embodiment of the H-Bridge control method.

The Extract Algorithm for Sign & Magnitude H-B Control Method:

This algorithm is based on the fact that, in the known in the art Sign & Magnitude H-Bridge control method, the current direction is known and the algorithm should extract the current value only. The algorithm, described hereinafter in FIGS. 9A-9D and FIG. 10, uses a fast clock 92, for example the system's general clock shown in FIG. 9A, that samples the current sense signal, as measured at the output of current sensor module 36, but stores only the highest measured value. FIG. 9B shows schematically the H-Bridge PWM clock; FIG. 9C shows schematically the waveform of the current sensed when the load current is stable or increasing; FIG. 9D shows schematically the waveform of the current sensed when the load current is decreasing.

The algorithm is suitable for systems that suffer from rise and fall time problems, but limits the PWM pulse to be wider than the rise or fall time involved. The execution of the algorithm is schematically described in the flow diagram of FIG. 10:

Task 100: The current sensed on resistor Rs 42, as measured at the output of current sensor module 36 and shown in FIG. 9C and FIG. 9D, is synchronized to the rising edge 91 of the fast clock 92 of FIG. 9A and to the rising edge 60 of the H-Bridge PWM clock waveform 61 of FIG. 9B.

Task 102: The load current sensed on resistor Rs 42, and measured at the output of current sensor module 36, is sampled by the fast clock 92.

Task 104: The load current value is extracted by a known in the art "peak detector" function included in algorithm module 40, as schematically shown in the diagrams of FIGS. 9C and 9D.

Task 106: The "peak detector" function, included in algorithm module 40, stores the highest value of the extracted current in each H-Bridge PWM clock waveform 61 period.

Task 108: The difference between the extracted peak current value and the desired control current is calculated.

Task 110: The next H-Bridge PWM pulse is calculated.

Task 112: check for the existence of the next H-Bridge PWM clock rising edge 60.

If "Yes"—go to Task 114;

if "NO"—return to Task 100.

Task 114: If "Yes"—the Peak Detector is zeroed.

Task 116: In this task the calculated "next H-Bridge PWM pulse" is stored, and

Task 118: The "next H-Bridge PWM pulse" is delivers to H-Bridge current control module 44 and subsequently to the H-Bridge module 12.

Task 120: Monitoring over-current: the extracted load current of Tasks 104 is compared with the over-current value.

Task 122: When over-current is detected, the electronic fuse 22 and/or the H-Bridge module 12 are shut-off It will be appreciated that the electronic circuit and method of current control of an H-Bridge type load driver is described. In certain embodiments, only a single sensor is required to be connected in the circuitry from which raw load current characteristics are obtained which can be interpreted and evaluated by an extract algorithm module part of a computerized system. The extract algorithm is adapted to the particular H-Bridge current control method in use. The results of the algorithm analysis are used by another module, part of same computerized system, to operate the H-Bridge for controlling the load current.

In the embodiments shown in FIG. 3 etseq. electronic, an optional safety switch is shown inserted in series with current sensor 16, and is operated by H-Bridge current control module 44 to provide over current protection in case of need.

The invention has been described in detail with particular reference to certain preferred embodiments thereof, but it will be understood that variations and modifications can be effected within the spirit and scope of the invention.

PARTS LIST 10 controller
11 power supply
12 H-Bridge module
14 load control current sensor
16 protection current sensor
18 wires
20 load
22 fuse
30 current control circuit
32 digital controller
34 fuse
36 current sensor module
40 load current analysis algorithm module 42 resistor Rs
44 H-Bridge current control module
46 analog to digital converter (A/D) unit
48 current $I_1$
50 current $I_2$
60 rising edge
61 clock waveform
62 falling edge
64 waveform
66 theoretical waveform
70 synchronize reading of current sensor, and output of current sensor module to rising edge of H-Bridge PWM clock task step
72 extract load current value and load current direction task step
74 calculate error between desired current and extracted current task step
76 calculate next H-Bridge PWM pulse task step
78 PWM>75% or PWM<25% task step
80 synchronize reading of current sensor to falling edge of H-Bridge PWM clock task step
82 extract load current value and load current direction task step
83 calculate error between desired current and extracted current task step
84 calculate next H-Bridge PWM pulse task step
85 next H-Bridge PWM pulse task step
86 H-Bridge current control module task step
88 extracted load current>over-current value task step
90 shutoff electronic fuse and/or shutoff H-Bridge module task step
91 rising edge
92 fast clock
100 synchronize reading of current sensed at output of current sensor module to rising edge of general clock and to H-Bridge PWM clock task step
102 sensed current sampled by general clock pulses task step
104 extract load current value task step
106 save highest load current value task step
108 calculate error between desired current and detected peak current task step
110 calculate next H-Bridge PWM pulse task step
112 look for rise time of clock task step
114 zero the peak detector value task step
116 next H-Bridge PWM pulse task step
118 H-Bridge current control module task step
120 extracted load current>over-current value task step
122 shutoff electronic fuse and/or shutoff H-Bridge module task step

The invention claimed is:

1. A current control electronic circuit comprising:
   a power supply;
   an H-Bridge module connected to a load;
   a current sensor connected between said H-Bridge module and said power supply and adapted to sense load current characteristics;
   a computerized controller connected to said current sensor and said H-Bridge module,
   wherein said computerized controller includes at least a module for operating load current analysis algorithm for analyzing said load current characteristics to determine current control parameters that provide over-current protection and load current control; and
   a load current control module for controlling said H-Bridge module based upon the current control parameters.

2. The circuit of claim 1, wherein said current sensor comprises at least one of a resistor, a Hall Effect magnetic field sensor, or a GMR magnetic field sensor connected between said H-Bridge module and said power supply and an analog to digital converter module.

3. The circuit of claim 1, wherein said module for operating a load current analysis algorithm can be adapted to a method of H-Bridge current control in use.

4. The circuit of claim 1, further comprising a safety switch connected in series with said current sensor between said H-Bridge module and said power supply.

5. The circuit of claim 4, wherein said safety switch is operated by said module for load current control module.

6. A method for controlling current flow in a load connected in an H-Bridge module, comprising:
   providing an H-Bridge module and a load connected in said H-Bridge;
   providing a power supply;
   providing a load control current sensor connected between said power supply and said H-Bridge module; and
   providing a computerized controller to said sensor and said H-Bridge module, said computerized controller including an algorithm module, wherein:
   current flowing through H-Bridge module load is measured by said current sensor; and said algorithm module uses a load current analysis algorithm to extract current control parameters from characteristics of the load current, and said computerized controller provides H-Bridge current control based upon the extracted current control parameters, said load current analysis algorithm being at least in part determined by the load current control method selected for controlling the H-Bridge.

7. The method for controlling current flow in a load connected in an H-Bridge module of claim 6, wherein said load current analysis algorithm is designed for use with the selected H-Bridge current control method.

8. The method for controlling current flow in a load connected in an H-Bridge module of claim 7, wherein said selected H-Bridge current control method is one of a locked anti-phase H-Bridge current control method and a sign and magnitude H-Bridge current control method.

9. The method for controlling current flow in a load connected in an H-Bridge module of claim 6, wherein said current control parameters are further used to operate an optional safety switch inserted in series with said current sensor.

* * * * *